US007673466B2

(12) United States Patent
Pacy

(10) Patent No.: US 7,673,466 B2
(45) Date of Patent: Mar. 9, 2010

(54) AUXILIARY POWER DEVICE FOR REFRIGERATED TRUCKS

(76) Inventor: David H. Pacy, 506 Big Mount Rd., Thomasville, PA (US) 17364

( * ) Notice: Subject to any disclaimer, the term of this patent is extended or adjusted under 35 U.S.C. 154(b) by 677 days.

(21) Appl. No.: 11/514,372

(22) Filed: Aug. 31, 2006

(65) Prior Publication Data
US 2007/0052241 A1    Mar. 8, 2007

Related U.S. Application Data

(60) Provisional application No. 60/712,988, filed on Aug. 31, 2005.

(51) Int. Cl.
*F25B 27/00* (2006.01)
(52) U.S. Cl. .......................... 62/236; 62/239
(58) Field of Classification Search .................. 62/236, 62/243, 244, 239; 165/43; 307/9.1, 10.1
See application file for complete search history.

(56) References Cited

U.S. PATENT DOCUMENTS

| 2,907,182 | A | * | 10/1959 | Kuklinski | 62/158 |
| 4,780,618 | A | * | 10/1988 | Wareman et al. | 62/236 |
| 5,123,257 | A | * | 6/1992 | Anderson et al. | 62/236 |
| 7,150,159 | B1 | * | 12/2006 | Brummett et al. | 62/236 |
| 2003/0106332 | A1 | * | 6/2003 | Okamoto et al. | 62/239 |
| 2004/0231831 | A1 | * | 11/2004 | Houck et al. | 62/236 |
| 2004/0250560 | A1 | * | 12/2004 | Ikura et al. | 62/236 |

* cited by examiner

*Primary Examiner*—William E Tapolcai
(74) *Attorney, Agent, or Firm*—Ober, Kaler, Grimes & Shriver; Royal W. Craig

(57) ABSTRACT

An auxiliary power device for attachment to an existing refrigeration unit of a refrigerated trailer to serve as a power source to a truck cab, thereby allow operation of electrical devices in said cab without idling of the truck's engine. The auxiliary power device comprises a housing attached beneath the existing refrigeration unit, an electric generator enclosed within the housing, and a pulley assembly mounted in the housing and connected by drive shaft to the generator. The pulley assembly is connected via drive belt to the diesel motor in the existing refrigeration unit. When the generator is activated a first relay governs the speed of the diesel motor in the refrigeration unit, which turns the generator to generate power, and a second relay prevents drainage of the refrigeration unit battery. The power from the generator is routed through a breaker panel mounted in the cab of the truck for distributing and regulating power from the battery and/or generator into the truck cab. Thus, the driver can power electric devices in the cab from the auxiliary power generation device without idling the truck's main engine, thereby reducing fuel consumption, harmful emissions, and prolonging engine life.

22 Claims, 6 Drawing Sheets

AUXILIARY POWER DEVICE FOR REFRIGERATED TRUCKS

CROSS-REFERENCE TO RELATED APPLICATIONS

The present application derives priority from U.S. Provisional Application Ser. No. 60/712,988; Filed: Aug. 31, 2005.

BACKGROUND OF THE INVENTION

1. Field of the invention

The present invention relates to refrigerated trucks and trailers ("reefers") and, more particularly, to an auxiliary power device for refrigerated trailers that acts as a power source to the truck's cab when the truck is parked, thereby allowing operation of heaters, air conditioning, outlets (for TV, microwaves, etc.), engine block heaters, and battery chargers, all without idling the truck's engine.

2. Description of the Background

When truck drivers park their tractor-trailers to load or unload, sleep, eat, shower or catch up on paperwork, most of the time they leave their truck running to keep the engine block warm and to operate the cab's air conditioning, heat, TV, VCR, computer and/or microwave. Trucks across the country spend millions of hours parked, yet idling their engines, burning fuel and releasing harmful emissions into the atmosphere. This is extremely inefficient and market forces are increasingly weighted against this:

- Diesel fuel prices are at an all time high ($2.60-3.60 per gallon)
- The government is passing increasingly strict idling and emissions laws.
- More and more energy-consuming amenities are being added to trucks to help the trucking industry find and retain quality drivers to man their fleets (they purchase optional creature comforts to enhance the driving experience). Driver comfort is imperative for improving moral, health benefits and reducing turnover.
- The cost of new tractor-trailers is at an all time high. Therefore, engine longevity is key to maximizing truck life, and idle use should be minimized.

Of all the trucks on the road today, approximately 40% are known as "reefers", e.g., trucks that have a refrigeration capability. These reefers haul everything from frozen food to fresh produce. A typical reefer includes a truck cab pulling a refrigerated trailer that is cooled by a large and expensive diesel refrigeration unit. FIG. 1 is a photo of a conventional reefer, inclusive of a truck cab pulling a refrigerated trailer that is so cooled by diesel refrigeration unit 1. In this case the refrigeration unit 1 is a Thermoking® SB3 Smart Reefer diesel generator-powered unit mounted to the front of the trailer, with enlarged control panel 2 inset. The unit is powered by a diesel motor, which through a series of dampers, clutches, drive belts, shaft seals, and idler pulleys turns a compressor to cool the trailer. The control panel 2 is a microprocessor-based programmable logic controller that uses temperature control algorithms to regulate the air temperature.

Deltek™ hybrid diesel electric technology from Carrier Transicold™ offers a similar yet simplified design featuring an electric-driven sealed compressor. This unit likewise relies on a diesel motor, but is connected to a generator that powers an electric motor inside the compressor housing. While this unit eliminates certain mechanical parts (dampers, clutches, drive belts, shaft seals, and idler pulleys to turn the compressor), it merely improves the efficiency of the refrigeration system. Neither of the foregoing systems nor any other deliver any power to the cab.

Consequently, whether a tractor-trailer is on the road or parked, these refrigeration units are always left running to maintain a constant temperature inside the trailer. It would be greatly advantageous to harness the power already being generated by these refrigeration units to power the cab's amenities (air conditioning, heat, TV, VCR, computer and/or microwave). The cost savings derived from reduced engine idling time would be significant:

For example, if we assume that annual fuel reduction=number of gallons burned per hour (approx. 1.75 gal per hour)×daily idling average (approx. 8 hrs)×days in use per year (240)×average current price of diesel ($3 per gal) =total cost savings per year per truck (over $10,000.00). Moreover, the benefits would include reduced engine hours, wear and tear, and reduction of harmful emissions released into the earth's atmosphere each year.

The general concept of an auxiliary power device for a tractor-trailer is known. For example, U.S. Pat. No. 4,780,618 discloses a tractor-trailer power conversion circuit that can be selectively actuated to direct power to the tractor unit from an auxiliary power source such as refrigeration unit or a conventional DC generator mounted on the trailer. The '618 patent shows a conversion circuit that uses either the refrigeration unit or a DC generator as an auxiliary power source. Similarly, U.S. patent application No. 20050063121 discloses an electrical system that uses a primary and secondary power supply for providing power to a truck's cab while the truck's engine is turned off. In one embodiment, the secondary power supply includes a generator mounted on the truck itself.

The present invention accomplishes the foregoing with the addition of an auxiliary power supply comprising a small electric generator (or alternator-style generator as will be explained) that derives mechanical power from the refrigeration unit and supplies electrical power to the truck's cab, thereby allowing the driver to turn off the truck's engine and still enjoy all the creature comforts provided in today's modern trucks. This saves fuel, cutting emissions and reducing wear and tear.

SUMMARY OF THE INVENTION

Accordingly, it is an object of the present invention to provide an auxiliary power device for refrigerated tractor-trailers that acts as a power source to the truck cab when the truck is parked, to allow operation of heaters, air conditioning, outlets (for TV, microwaves, etc.), engine block heaters, battery chargers, etc., all without idling the truck's engine.

It is another object to provide an auxiliary power device for refrigerated trucks that reduces the collective millions of hours of needless idling of engines, thereby saving fuel and reducing harmful emissions into the atmosphere.

It is still another object to provide an auxiliary power device for refrigerated trucks that prolongs engine life by reducing wear and tear.

It is still another object to provide an auxiliary power source for trucks pulling refrigerated trailers that can be retrofit to current refrigeration fleets (corporate trucking companies), sold as self-install kits for individual owner-operators, or as original equipment on new refrigerated trailers.

In accordance with the foregoing objects, the present device comprises an auxiliary power device for integration with an existing refrigeration unit of a refrigerated trailer to serve as a power source to a truck cab, thereby allow operation of electrical devices in said cab without idling of the truck's primary engine. The auxiliary power device generally comprises a housing attached to the refrigerated trailer (such as beneath the existing refrigeration unit), and an electric pulley-driven generator (conventional or alternator-style generator) enclosed within the housing. A pulley assembly is also mounted in the housing proximate the generator and is connected by a drive shaft thereto for turning the generator and generating electrical power. The drive belt is connected at one end via pulley to the diesel motor in the existing refrigeration unit, and passes downward through the refrigeration unit enclosure through a pass-through aperture in the auxiliary power device housing for connection at its other end to the pulley assembly or electric clutch assembly. A switch is mounted on the housing enabling/disabling the generator, either directly and electrically (for alternator-style generator) or mechanically via the electric clutch assembly (for conventional style generators).

The electrical output from the generator should be 110V 60 Hz AC in order to power the amenities in the truck cab, and especially the air conditioner which can be very stringent. Obtaining the required sixty (60) hertz may be accomplished by limiting the generator to a constant rotational speed. While a variable speed transmission would serve this end, this is too cumbersome a solution for present purposes.

One approach is to regulate the generator power output mechanically by an optional electric clutch assembly on the generator to selectively engage the pulley assembly to start the generator drive. This affords a brief start-up delay during which two relays activate, one to control the motor speed of the refrigeration unit, and the other to prevent drainage of the refrigeration unit battery. A switch on the housing of the auxiliary power device is connected to the first relay, which is in turn connected to the existing fuel solenoid at the control panel of the refrigeration unit for controlling the speed of the diesel motor in the refrigeration unit upon engagement of the switch. When the switch is engaged the diesel motor speed is regulated (to a low speed of approximately 1400 rpm), and the pulley/electric clutch assembly is engaged to turn the generator and generate power at an acceptable 110V 60 Hz AC. The switch also controls a second relay that prevents drainage from the refrigeration unit battery when the generator is not generating power (albeit the present system does not charge the refrigeration unit battery). In operation, a driver simply turns the existing refrigeration unit on, switches on the generator via the switch to engage the pulley/electric clutch assembly and activate the first relay (controlling the motor speed of the refrigeration unit), thereby causing the pulley/electric clutch assembly to turn the electric generator and produce electric current for use in the cab.

Another solution is a variable-speed generator system that adjusts the frequency of the current supplied to the stator windings of the generator so as to regulate the power generated to sixty (60) hertz in a sinusoidal waveform, despite the speed of the diesel motor in the refrigeration unit, with current and voltage signals being completely in phase.

In both of the foregoing cases the generator power is routed to the truck cab through a power distribution which includes a fused circuit breaker panel (with circuit breakers) mounted in the cab of the truck for distributing power from the electric generator into the truck cab, and yet preventing over-current thereto. Thus, the drive can power electric devices in the cab from the auxiliary power generation device without idling the truck's main engine. This reduces the collective millions of hours of needless idling of truck engines, thereby saving fuel, reducing harmful emissions into the atmosphere, and prolonging engine life by reducing wear and tear.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENTS

The present invention is an auxiliary power device for refrigerated trucks that acts as a power source to the truck's cab when the truck is parked, thereby allowing operation of heaters, air conditioning, outlets, engine block heaters, battery chargers, etc., all without idling the truck's engine. The auxiliary power device may be provided as original equipment in new refrigerated trucks, or may be a retrofit kit for existing trucks. A retrofit example is described in detail below implemented in conjunction with a conventional Thermoking® Smart Reefer diesel generator-powered refrigeration unit 1 at the front of the trailer, though most any diesel or hybrid diesel-electric refrigeration unit driven by a motor will suffice.

Figure 1:
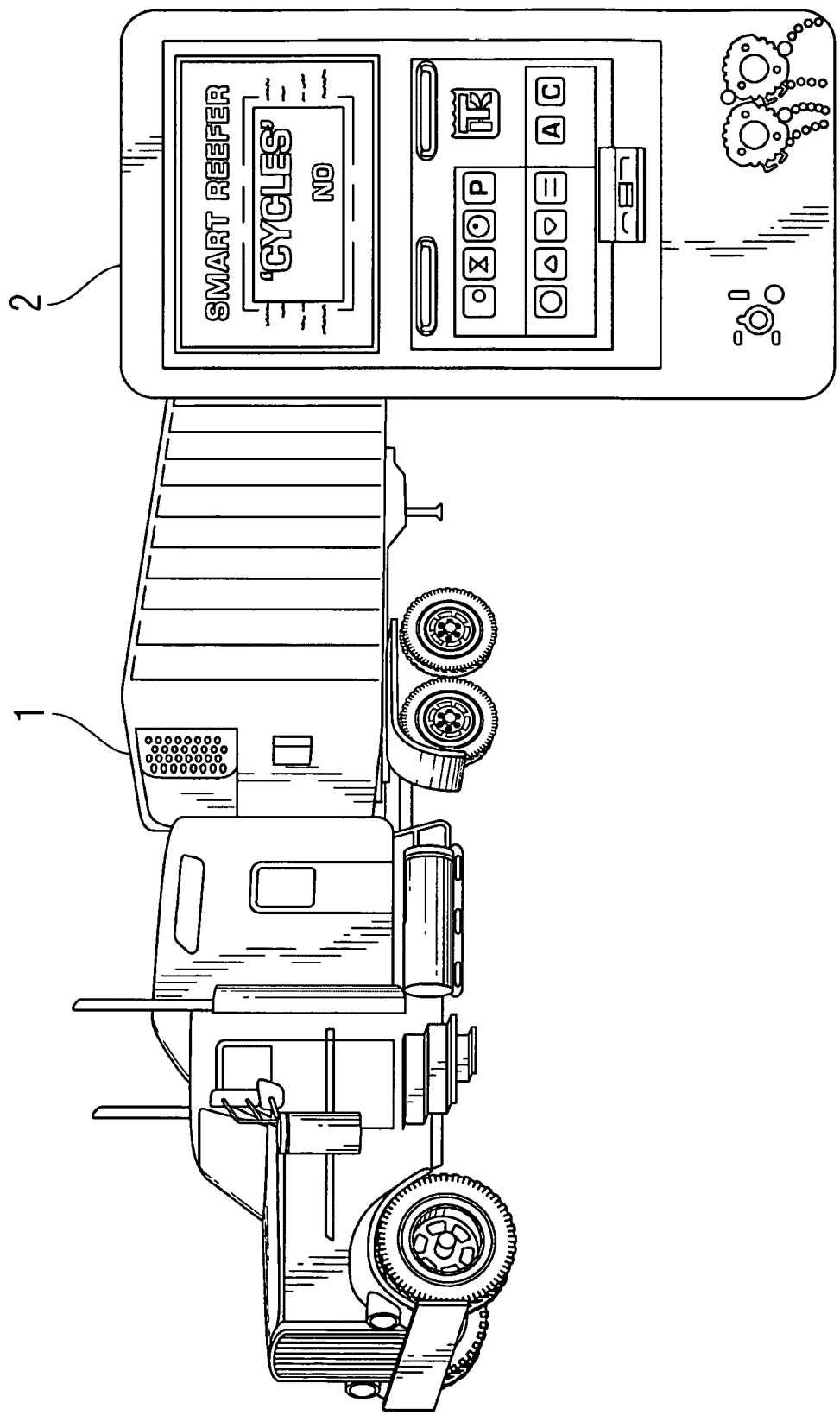
FIG. 1 is a photo of a conventional reefer (here a Thermoking® SB3 Smart Reefer) having a diesel generator-powered refrigeration unit 1 mounted to the front of the trailer (with enlarged control panel 2 inset).
Figure 2:
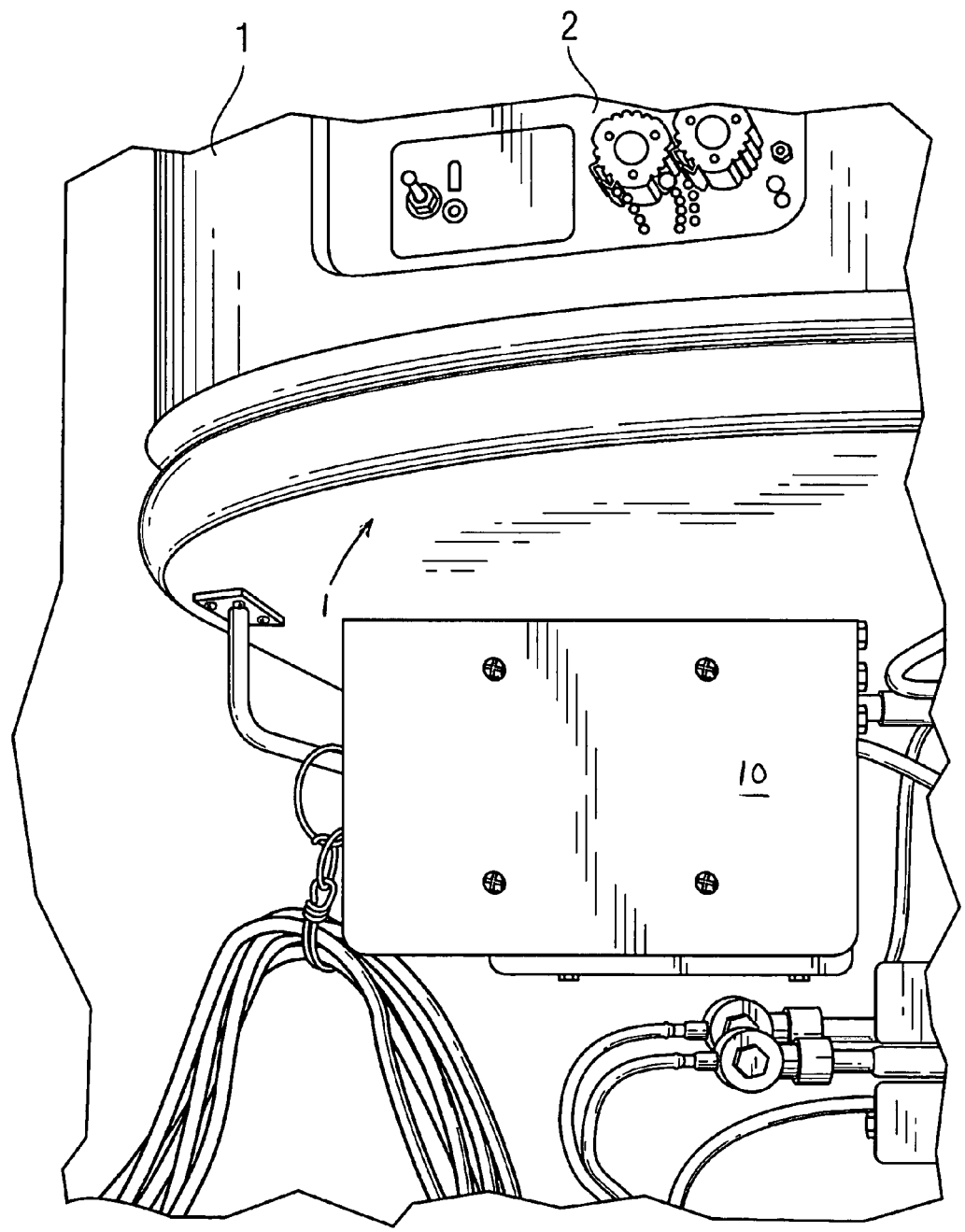
FIG. 2 is a side perspective view of the auxiliary power device 10 according to a preferred embodiment of the present invention.
Figure 3:
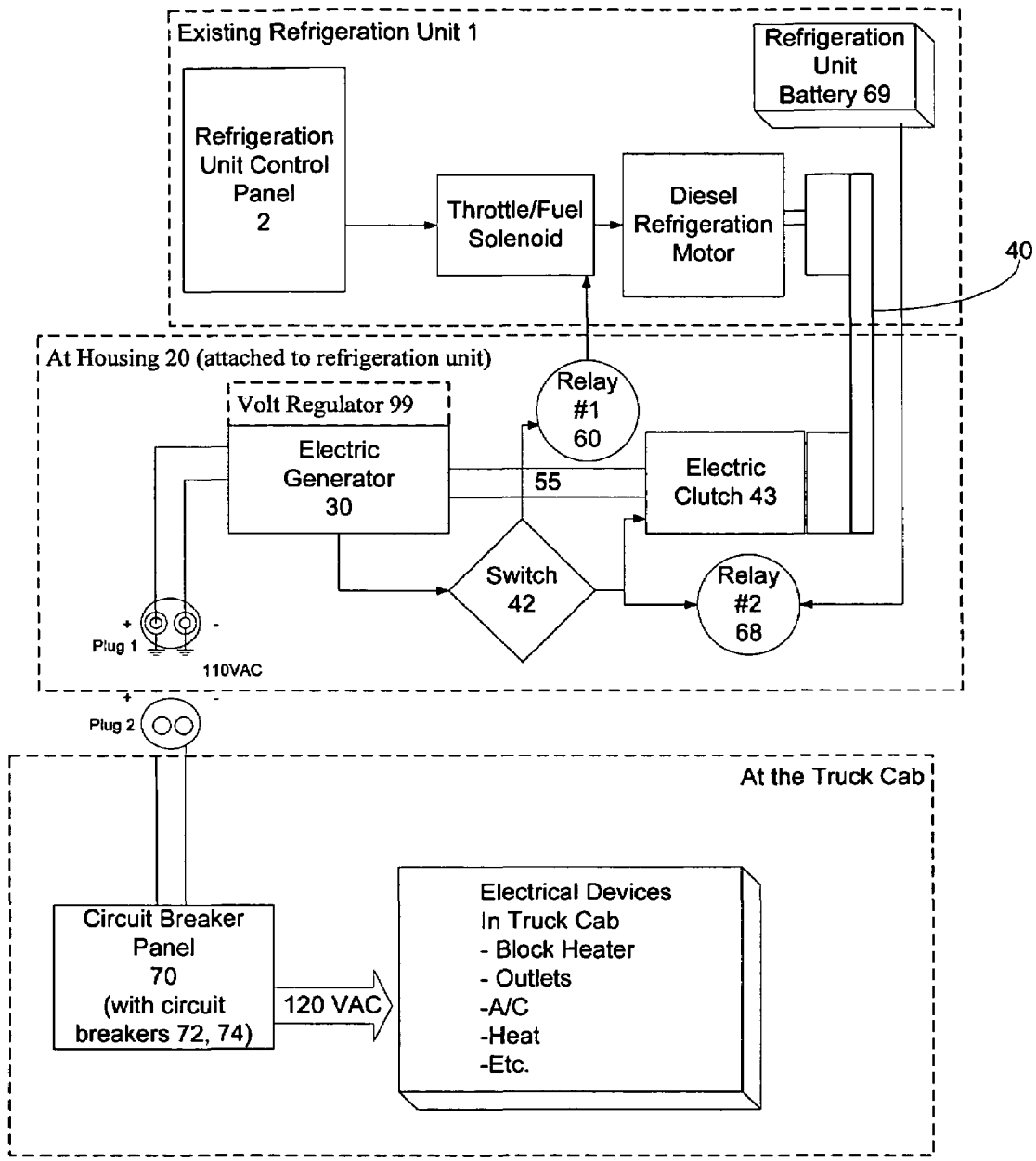
FIG. 3 is a block diagram of the auxiliary power device 10.
Figure 4:
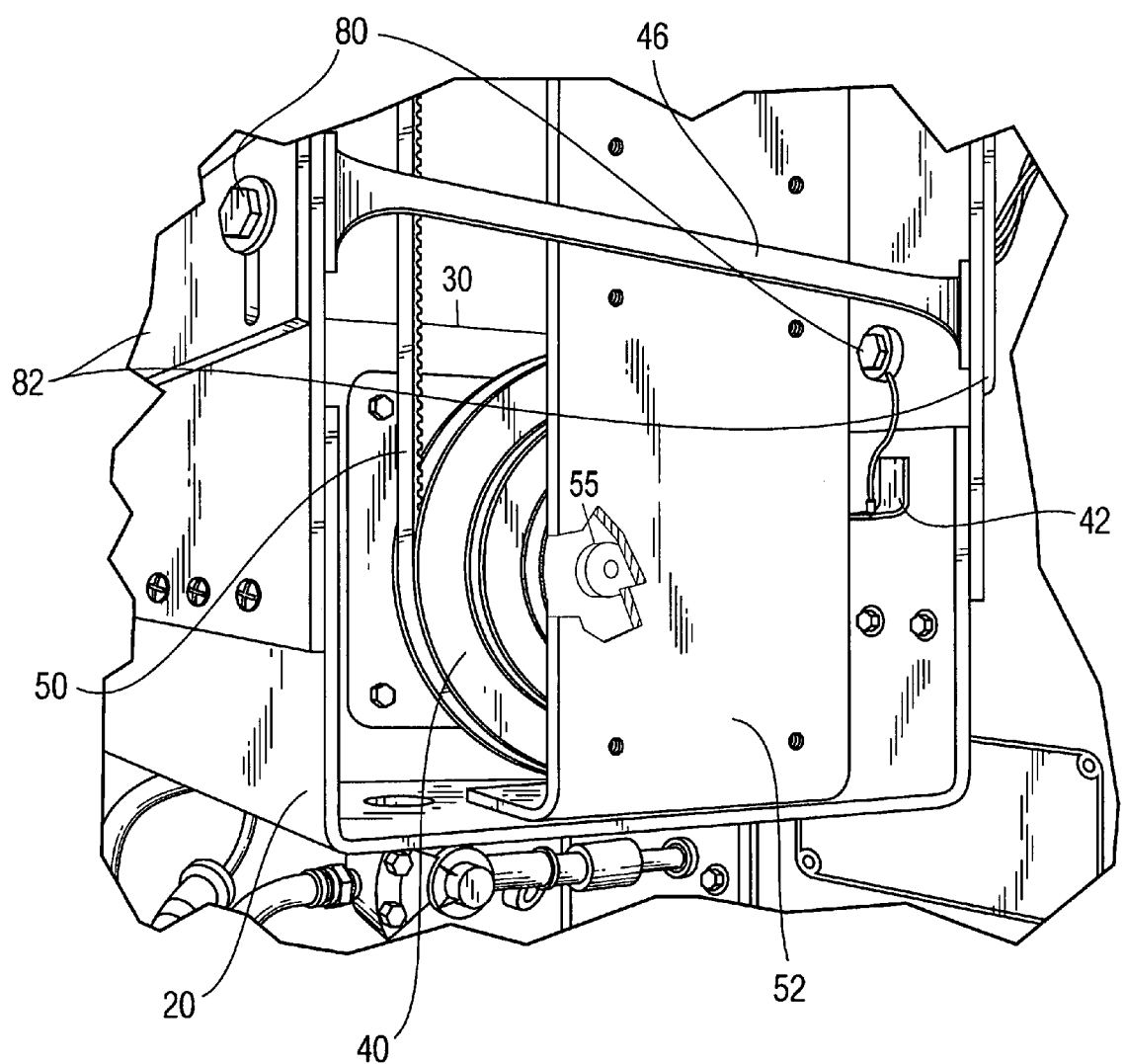
FIG. 4 is a partially disassembled view showing the internal components of the auxiliary power device 10 of FIGS. 2 and 3.

FIG. 2 is a side perspective view of the auxiliary power device 10 according to a preferred embodiment of the present invention implemented with a Thermoking® Smart Reefer diesel generator-powered refrigeration unit 1 at the front of the trailer. FIG. 3 is a block diagram of the auxiliary power device 10, and FIG. 4 is a partially disassembled view showing the internal components of the auxiliary power device 10 of FIGS. 2 and 3. As seen in FIG. 2, the auxiliary power device 10 may be mounted anywhere on the refrigerated trailer, but is most unobtrusively mounted beneath the refrigeration unit 1 at the front of the trailer. With combined reference to FIGS. 2-4, the auxiliary power device 10 generally comprises an open-top five-walled suspension housing 20 for attachment beneath the existing refrigeration unit 1, and a generator 30 enclosed within the housing 20. The generator may be a conventional generator, an alternator-style generator, or a variable-speed generator, as will be described. Although the illustrated housing 20 is separate from that of the existing refrigeration unit 1, one skilled in the art will appreciate that the auxiliary power device 10 may be incorporated inside of the refrigeration unit 1 and rely on its housing. This is more possible for alternator-style generators which are comparatively small. In such case the drive belt 50 may also be a pre-existing drive belt in the refrigeration unit 1, shared with the generator 30.

The housing of FIGS. 2-4 comprise an open-top five-walled suspension housing 20 for attachment beneath the existing refrigeration unit 1, and a generator 30 enclosed within the housing 20. In all cases the generator 30 is mechanically-driven by a pulley assembly 40 mounted in the housing 20 proximate the generator 30. A drive belt 50 (preferably a double belt) is looped at one end around the pulley assembly 40, and is routed up into the enclosure for the diesel generator-powered refrigeration unit 1 for connection therein to the existing diesel motor. There are three options for generator 30, in each case the configuration of the supporting components changing slightly to ensure that uniform 110V 60 Hz AC power is supplied to the amenities in the truck cab, including the air conditioner.

The first is a single-phase (or three-phase) AC generator. However, some truck cab appliances require a frequency of 60 cycles for some of the internal cab appliances, especially air conditioning. Since the existing refrigeration unit diesel motor speed is variable, and automatically controlled, it is necessary to impose a constant rate. Most conventional generators require a 3600 rpm input drive +/−3%, and alternator style generators require a minimum of 3600 rpms. However, the diesel motor in refrigeration unit 2 will typically run at 1375-1425 rpm engine speeds when set on a low speed setting. The present invention employs a 2.57× size differential in the pulley assembly 40 to make the requisite speed translation. In addition, the diesel motor in refrigeration unit 2 is automatically set to its low speed setting, thereby ensuring constant diesel motor speed, constant generator 30 rotational speed, constant voltage and 60 Hz output for powering the truck cab amenities. The diesel motor in refrigeration unit 2 is automatically set to its low speed setting by imposing a slight delay between turning on of the auxiliary power device and actual turning of the generator, during which delay the control panel 2 and, specifically, the fuel solenoid of the diesel motor is overridden to set its speed (indeed, two relays are activated, one to control the motor speed of the refrigeration unit, and the other to prevent drainage of the refrigeration unit battery). More specifically, and as seen in FIG. 3, an electric clutch assembly 43 is incorporated in the pulley assembly 40 to selectively engage the pulley assembly 40 or not in order to control the generator drive. The clutch 43 of the pulley assembly 40 is engaged/disengaged by a panel-mount switch 42 mounted on the rear panel of housing 20. The existing diesel motor is also equipped with an auxiliary pulley 44 to carry the drive belt 50, and the enclosure is machined with a belt passage 46 for downward routing of the drive belt 50 to the pulley 40/electric clutch 43 assembly.

As seen in FIG. 4, the pulley assembly 40 is coupled by a drive shaft 55 to the electric generator 30 (also enclosed within the housing 20) for turning the rotor and generating current. In addition to engaging the pulley 40/electric clutch 43 assembly, switch 42 is connected to a first relay 60 (to be described) that controls the existing throttle/fuel solenoid for the diesel refrigeration motor, effectively overriding the control panel 2 of the refrigeration unit 1 at the front of the trailer and forcing refrigeration unit 1 to run at a set speed. This ensures that generator 30 maintains its predetermined rotation speed to provide a uniform 110V 60 Hz AC power output. For example, the illustrated Thermoking® Smart Reefer can be programmed to operate its diesel motor at high or low speeds, the low setting resulting in 1400 rpms. A number of suitable generators 30 are identified below, and like generators of commensurate size will require a 3600 rpm input drive +/−3% continuous rpms for operation (alternator style generators requiring at least 3600 rpms). As described above, the present pulley assembly 40 employs a 2.57× size differential between the diesel motor and generator pulleys in order to make the requisite speed translation. In addition, the diesel motor in refrigeration unit 2 is automatically set to its low speed setting, thereby ensuring constant diesel motor speed, constant generator 30 rotational speed, constant voltage, and 60 Hz output. Hence, when switch 42 is activated, it first activates the first relay 60 to override the control panel 2 settings of the refrigeration unit 1 to peg refrigeration unit 1 at its low speed setting, ensuring the continuous 1400 rpm diesel output to turn generator 30. Next it engages the pulley 40/electric clutch 43 assembly. The electric outputs from generator 30 are connected by insulated heavy duty wire to a standard grounded (three-prong) "twist" plug such as used on household clothes dryers, which can then be connected by a mating plug to the truck cab in a series loop. The switch 42 is also connected to a second relay 68 mounted on the refrigerated trailer (reefer) battery as will be described. The second relay 68 prevents drainage of the reefer battery when electric generator 30 is running. The generator 30 outputs are connected via the three-prong plugs (Plug 1 & Plug 2) to a fused circuit breaker panel 70 in the cab for preventing over-current and selectively applying power to cab devices.

By way of example, the electric generator 30 enclosed within the housing 20 may be a conventional-style (brush) 35 ampere 6500 generator front end, or an equivalent brushless alternator-style generator. For example, a Mecc Alte EC 35 Amp 6500 peak watt (5300 continuous watt) alternator-style generator is an example of a suitable generator 30. It is dimensioned at 22"1×13.5" w×9.5" h. The generator 30 rotor is connected by conventional drive shaft to the pulley 40/electric clutch 43 assembly. A variety of conventional electric clutch assemblies are well-suited for this purpose, all employing a magnetic coil that pulls an armature into contact with a rotor (attached to a hub which is in turn connected by drive belt 50 to the refrigeration unit 1 diesel motor). When engaged, the armature begins to rotate, turning the attached drive belt 50. When the switch 42 is turned off, the magnet releases the armature and the drive belt 50 is quickly stopped by an internal braking mechanism. For example, a Warner Electric CVX or MAG-STOP, or Ogura MA-GT-EXM3X model electric clutch assembly is well-suited for present purposes.

One skilled in the art should understand that the use of relay 60 makes diesel speed control an automatic effect when the auxiliary power device is switched on. Diesel speed control can alternatively be accomplished without a relay, simply by a switch connected to the throttle solenoid to control the throttle solenoid and prevent engine from going to high speed.

The pulley assembly 40 is engaged/disengaged by a panel-mount switch 42 mounted on the rear panel of housing 20. The existing diesel motor is equipped with an auxiliary hub 44 to carry the drive belt 50, and the enclosure is machined with a belt passage 46 for downward routing of the drive belt 50 to the pulley 40/electric clutch 43 assembly. The pulley 40/electric clutch 43 assembly is coupled by a drive shaft 55 to the electric generator 30 (also enclosed within the housing 20) for turning the rotor and generating current. In addition to engaging the pulley 40/electric clutch 43 assembly, switch 42 is connected to a first relay 60 (to be described) that controls the existing throttle/fuel solenoid for the diesel refrigeration motor, effectively overriding the control panel 2 of the refrigeration unit 1 at the front of the trailer and forcing refrigeration unit 1 to run at a set speed. This ensures that generator 30 maintains its predetermined rotation speed to provide a uniform 110 V 60 Hz AC power output.

In operation of the above-described embodiment, the driver simply turns the existing refrigeration unit 1 on "continuous" (via control panel 2), switches on the generator 30 via switch 42, thereby activating the first relay 60 to maintain refrigeration unit 1 at its low speed (1400 rpm), activating the second relay 68 to prevent drainage of the reefer battery when electric generator 30 is running, and finally engaging the pulley 40/electric clutch 43 assembly. With pulley 40/electric clutch 43 assembly engaged the generator 30 will produce 110 VAC electric power for powering electric devices in the truck cab inclusive of the block heater, outlets, A/C, heat, etc. The driver need only go to the breaker panel 70, connect and switch on the desired cab accessories. The driver is then free to turn off the truck's main engine to save fuel, cut emissions and reduce wear and tear.

Alternatively, the generator 30 may be a regulated generator (that employs rectifiers to regulate the output). In this case a voltage regulator module 99 is used with the rotating generator 30 to control the generator output. The generator 30 will produce a constant output despite engine speed fluctuations and the above-mentioned electric clutch assembly is not required. The Fabco™ Power-Mite™ PM-110, Blue-Max™ models, or Tenaire Industries, Inc. Model 40/3.5 generator with model TR 1540-120F regulator are suitable examples of generator/regulator combinations for present purposes. These and others are typically designed to operate at between 1375-1425 rpms and yet provide constant voltage at within a varying range of speeds by use of the regulator 99. Specifically, the PM-110 model will produce 37 peak amperes 4500 watts continuous, which is electronically regulated to 110 VAC single-phase by the on-board Power-Mite™ voltage regulator 99. This unit is dimensioned at only 10½"×8" and weighs only 32 lbs. In this case the generator 30 rotor is equipped with an OEM pulley, which is in turn connected by drive belt 50 to the refrigeration unit 1 diesel motor. No electric clutch 43 is needed, and no throttle regulation relay 60. When the refrigeration unit diesel runs it drives the attached drive belt 50 and the generator 30 armature begins to rotate within an acceptable range of speeds.

As above, the driver simply turns the existing refrigeration unit 1 on "continuous" (via control panel 2), which drives the generator 30, automatically activating the first relay 60 to maintain refrigeration unit 1 at its low speed (1800 rpm), activating the second relay 68 to prevent drainage of the reefer battery when electric generator 30 is running. With pulley assembly 40 engaged the generator 30 will produce 110 VAC electric power for powering electric devices in the truck cab inclusive of the block heater, outlets, A/C, heat, etc. The driver need only go to the breaker panel 70, connect and switch on the desired cab accessories. The driver is then free to turn off the truck's main engine to save fuel, cut emissions and reduce wear and tear.

In all of the foregoing cases the drive belt 50 is preferably a standard toothed belt of approximately 36" length.

The housing 20 is preferably an aluminum suspension-enclosure with five panel-walls (open-topped) forming approximately a 42"1×6" h×8" w enclosure. A plurality of holes are drilled in the bottom panel to make internal grease fittings accessible, and also to evacuate moisture. As seen in FIG. 4, the side panels of housing 20 are preferably removable to allow access to the interior components. The housing 20 is mounted beneath the refrigeration unit 1 at the front of the trailer via four bolt/washer combinations 80 at the corners of the housing 20. Front and back suspension plates 82 may be welded to the refrigeration unit 1 enclosure (protruding downwardly there from) to facilitate mounting of housing 20 there beneath. Preferably, a reinforcing bracket 52 (see FIG. 4) is secured between the refrigeration unit 1 and the bottom panel of the housing 20, covering and protecting the drive belt 50 and pulley 40/electric clutch 43 assembly (or protecting the driver there from). Reinforcing bracket 52 is a steel plate that also provides additional support and vibration damping at the point of rotation of the pulley 40/electric clutch 43 assembly. If desired, the entire housing 20 may be further enclosed in a removable fiberglass shell and painted for aesthetics to match the trailer.

Switch 42 is a standard panel-mount toggle switch attached to the rear of housing 20 for convenient driver-access. One contact of switch 42 may be grounded as shown to the housing 20 itself, and the other contact is connected to the pulley 40/electric clutch 43 assembly for activation thereof, and to both relays 60, 68.

The first relay 60 and second relay 68 may both be a standard air conditioning and heater switching controller relay such as a Line Electric LT41 Series relay with quick connect terminals and a 30 amp contact ratings.

Figure 5:
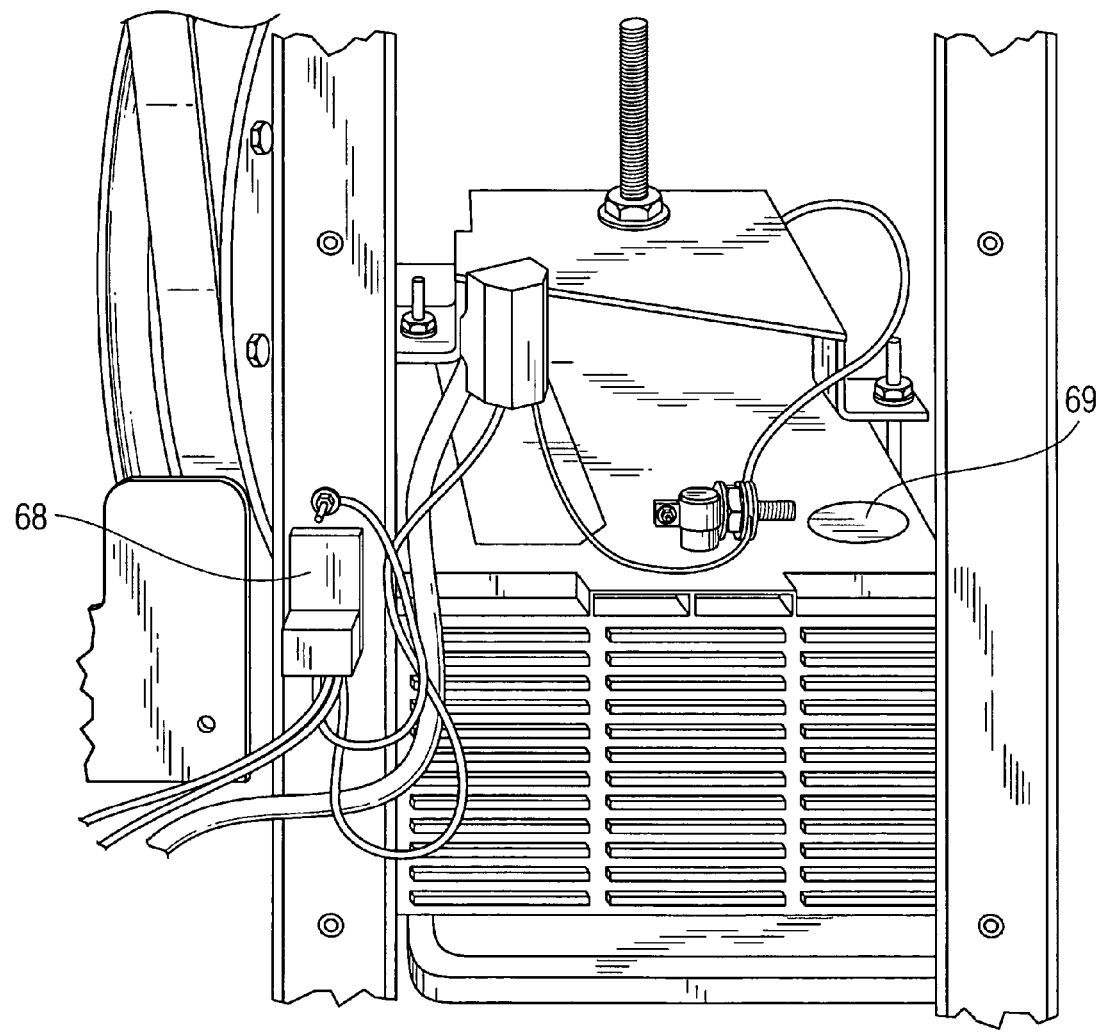
FIG. 5 illustrates the wiring at the refrigeration unit battery compartment.

FIG. 5 illustrates the wiring at the refrigerated trailer battery compartment inclusive of the refrigeration unit battery 69. The above-described second relay 68 is mounted proximate the refrigeration unit battery 69, preferably alongside on an existing strut. The (+) and (−) outputs from the electric generator 30 are connected via a short length of shielded wire to a standard grounded plug, which couples to a mating plug wired onward to the breaker panel 70 (described below). The second relay 68 is connected between the switch 42 and the refrigeration unit battery 69 as shown, the second relay 68 being activated by switch 42 to prevent drainage from the refrigeration unit battery 69 when the system is operating. The first relay 60 is connected between the switch 42 and the existing throttle/fuel solenoid of the diesel refrigeration unit motor as shown, the first relay 60 being activated by switch 42 to override the control panel 2 settings of the refrigeration unit 1 to peg refrigeration unit 1 at its low speed setting, ensuring the continuous 1400 rpm output to turn generator 30 at a continuous 3600 rpm. The electrical connections from generator 30 to the truck cab will now be described in more detail with reference to FIGS. 5 and 6.

Figure 6:
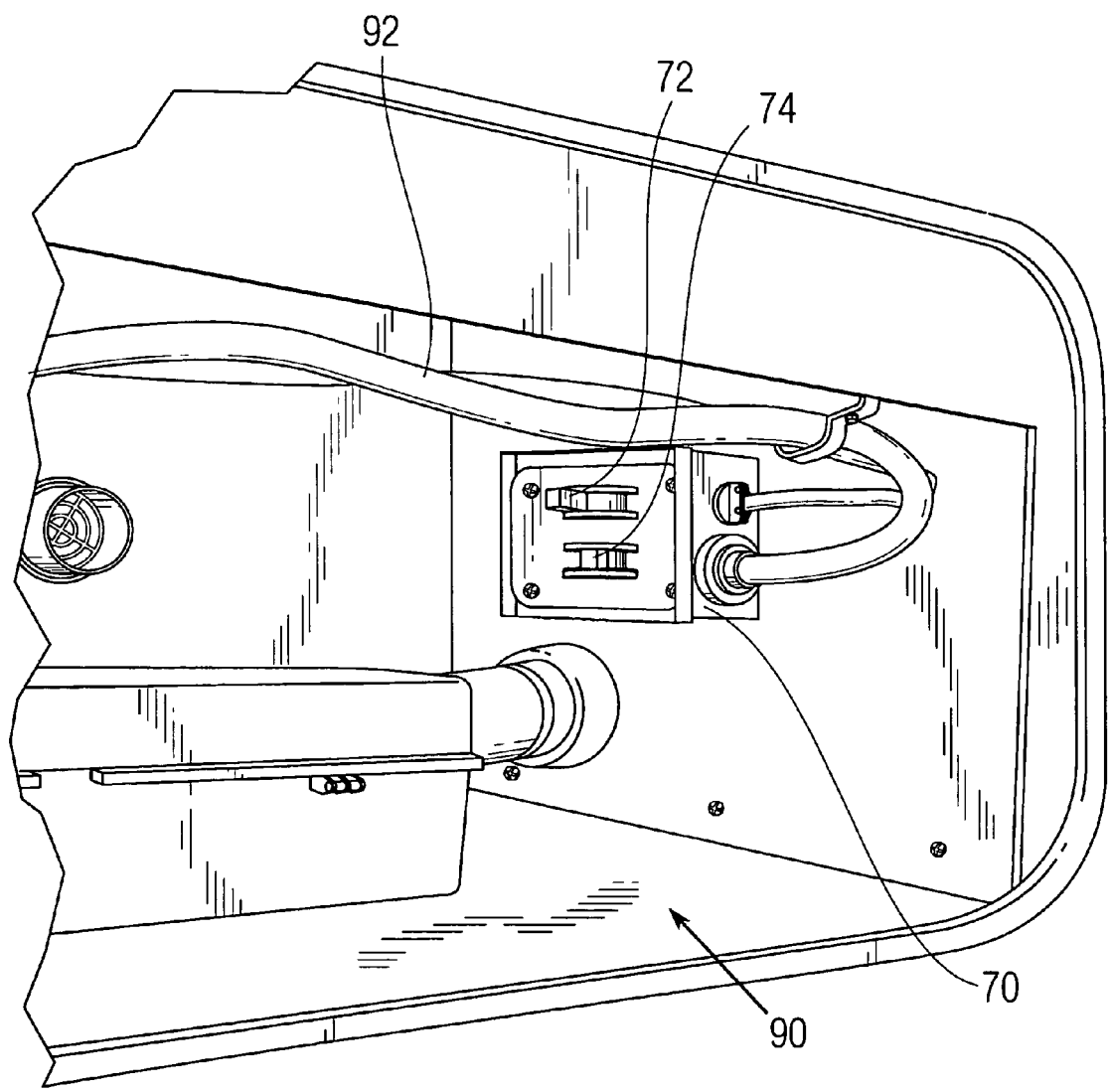
FIG. 6 is a perspective photo showing how the auxiliary power device 10 is wired up to the truck cab.

FIG. 6 is a perspective photo showing how the generator 30 is wired up to the truck cab. The (+) and (−) leads from the generator 30 are connected via a short length of shielded wire to a standard grounded plug, which couples to a mating plug wired onward to a fused circuit box, e.g., breaker panel 70, which can be placed in various locations on the truck cab. Most eighteen-wheeler trucks are equipped with an external storage portal 90 near the passenger doors to provide storage as well as easy access to the cab electrical wiring. The storage portal 90 is accessed by removal of a hatch. It is preferred that the breaker panel 70 be situated inside the storage portal 90 as shown, and it can be mounted on a side wall thereof. Breaker panel 70 is simply a UL-approved 250V junction box with receptacles for two calibrated circuit breakers 72, 74. The line output from the generator 30 is connected on to the breaker panel 70, where it is split into two 110 VAC power supply lines each protected by one of the circuit breakers 72, 74. Of course, the line output from the generator 30 can be split into as many 110 VAC power supply lines as desired, and a commensurate number of circuit breakers may be used to protect each line. The outputs from circuit breakers 72, 74 are connected to conventional 110 VAC power receptacles mounted in the cab of the truck to allow operation of heaters, air conditioning, outlets (for TV, microwaves, etc.), engine block heaters, battery chargers, etc., all without idling the truck's engine. The circuit box 70 may optionally be equipped with an array of switches to operate amenities inside the truck, namely the outlets, block heater, battery charger, A/C and heat pump, etc.

It should now be apparent that the above-described auxiliary power supply 10 supplies 110 volts, 60 Hz, at ample current to the truck's cab, thereby allowing the driver to turn off the truck's engine and still enjoy all the creature comforts provided in today's modem trucks. This saves fuel, cuts emissions and reduces wear and tear on the engine. The auxiliary power supply 10 is adaptable to be retro-fit to current refrigeration fleets (corporate trucking companies), sold as self-install kits for individual owner-operators, or as original equipment on new refrigerated trailers.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An auxiliary power device for trucks having a cab and a towed refrigerated trailer having an on-board motor-powered refrigeration unit, the auxiliary power device supplying electrical power to the truck cab when parked for supplying auxiliary 120 VAC electrical power to said truck cab without idling the truck's engine, comprising:
    a housing attached beneath the existing refrigeration unit of said refrigerated trailer, said housing having a pass-through aperture;
    an electric generator enclosed within said housing;
    a pulley assembly mounted in said housing proximate the generator and connected thereto for turning the generator and generating electrical power;
    a drive belt connected at one end via pulley to the motor of said existing refrigeration unit, and connected at another end to said pulley assembly;
    control means connected between said generator and a throttle/fuel solenoid of the refrigeration unit motor for controlling the speed of said motor in said existing refrigeration unit;
    a relay connected between said generator and the refrigeration unit battery for preventing drainage from said battery; and
    a junction box mounted on the cab of said truck, at least one electrical output from said generator being connected to said junction box for distributing power from said electric generator to said truck cab.

2. The auxiliary power device for trucks according to claim 1, further comprising a second relay connected between said generator and an existing battery of said refrigeration unit for preventing drainage from said battery when said generator outputs power.

3. The auxiliary power device for trucks according to claim 1, wherein said generator is a conventional generator having brushes.

4. The auxiliary power device for trucks according to claim 3, wherein said generator comprises an on-board regulator.

5. The auxiliary power device for trucks according to claim 1, wherein said generator is an alternator-style brushless generator.

6. The auxiliary power device for trucks according to claim 5, wherein said generator comprises an on-board regulator.

7. The auxiliary power device for trucks according to claim 1, wherein said first relay overrides a control panel setting of the refrigeration unit to maintain a low speed setting to ensure at least a 1400 rpm output from said diesel motor.

8. The auxiliary power device for trucks according to claim 1, further comprising an electric clutch connected between said generator and pulley assembly, and a switch for activating said electric clutch, thereby allowing manual starting and stopping of said generator despite turning of the diesel motor in said refrigeration unit.

9. The auxiliary power device for trucks according to claim 1, further comprising a receptacle mounted proximate said generator, and an electrical cord having opposing plugs connected on one end to the generator receptacle and at another end to said fused breaker panel.

10. The auxiliary power device for trucks according to claim 1, wherein said drive belt is toothed.

11. The auxiliary power device for trucks according to claim 1, wherein said junction box is a fused breaker panel mounted external to said truck cab.

12. The auxiliary power device for trucks according to claim 11, wherein said breaker panel is mounted inside an existing storage portal of said truck cab.

13. An auxiliary power device for trucks having a cab and a towed refrigerated trailer having with on-board diesel-motor-powered refrigeration unit, the auxiliary power device supplying electrical power to the truck cab when parked for powering any one from among a group of heaters, air conditioning, outlets, engine block heaters, and battery chargers without idling the truck's engine, comprising:
    an electric generator mounted proximate said diesel-motor-powered refrigeration unit;
    a pulley assembly connecting the diesel-motor of said refrigeration unit to said electric generator for turning the generator and generating electrical power, said pulley assembly further comprising a drive belt connected at one end via pulley to said diesel motor in said refrigeration unit and connected at another end to said electric generator;
    a means connected between said generator and a throttle/fuel solenoid of the refrigeration unit diesel motor for controlling the speed of said motor;
    a breaker panel mounted on the cab of said truck, said breaker panel including at least one fuse and at least one receptacle, said generator being electrically connected to aid receptacle via said fuse for preventing over-current when distributing power from said electric generator to said truck cab;
    whereby a driver turns the existing refrigeration unit on, controls the motor speed of said refrigeration unit, turning said generator at said controlled motor speed, and thereby producing electric current at said at least one receptacle for powering electric devices in the cab without idling the truck's main engine.

14. The auxiliary power device for trucks according to claim 13, further comprising a second relay connected between said generator and an existing battery of said refrigeration unit for preventing drainage from said battery when said generator is rotating.

15. The auxiliary power device for trucks according to claim 13, wherein said generator is a conventional generator having brushes.

16. The auxiliary power device for trucks according to claim 15, wherein said generator comprises an on-board regulator.

17. The auxiliary power device for trucks according to claim 13, wherein said generator is an alternator-style brushless generator.

18. The auxiliary power device for trucks according to claim 13, wherein said first relay overrides a control panel setting of the refrigeration unit to maintain a low speed setting to ensure a constant rpm output.

19. The auxiliary power device for trucks according to claim 13, further comprising an electric clutch connected between said generator and pulley assembly, and a switch for activating said electric clutch, thereby allowing manual starting and stopping of said generator despite turning of the diesel motor in said refrigeration unit.

20. An auxiliary power device for trucks having a cab and a towed refrigerated trailer having with on-board diesel-motor-powered refrigeration unit, the auxiliary power device supplying electrical power for use in the cab of said truck, comprising:

an electric generator mounted on said a towed refrigerated trailer;

a pulley assembly connecting the diesel-motor of said refrigeration unit to said electric generator for turning the generator and generating electrical power, said pulley assembly further comprising a drive belt connected at one end via pulley to said diesel motor in said refrigeration unit and connected at another end to said electric generator;

a controller for controlling the speed of said motor in said existing refrigeration unit;

an electrical outlet mounted on the cab of said truck, said electrical outlet being electrically connected to said generator for distributing power from said electric generator to said truck cab;

whereby a driver turns the existing refrigeration unit on, thereby controlling the diesel motor speed of said refrigeration unit, and turning said generator at said controlled motor speed to producing electric current at said electrical outlet for powering electric devices in the cab without idling the truck's main engine.

21. The auxiliary power device for trucks according to claim 20, further comprising a second relay connected between said generator and an existing battery of said refrigeration unit for preventing drainage from said battery when said generator is rotating.

22. A method for supplying auxiliary power to the cab of a truck towing a refrigerated trailer having with on-board diesel-motor-powered refrigeration unit, for powering any one from among a group of heaters, air conditioning, outlets, engine block heaters, and battery chargers without idling the truck's engine, comprising:

mounting an electric generator proximate said diesel-motor-powered refrigeration unit and connecting said generator to a diesel-motor in said refrigeration by a pulley assembly;

overriding a temperature control of said diesel-motor-powered refrigeration unit to turn said diesel motor at a controlled speed;

said pulley assembly concurrently turning said generator at a controlled speed;

conducting power from said generator to a breaker panel mounted on the cab of said truck for powering electric devices in the cab without idling the truck's main engine.

* * * * *